United States Patent
Nishimura

(10) Patent No.: US 8,294,828 B2
(45) Date of Patent: Oct. 23, 2012

(54) IMAGE/TONE CONTROL DEVICE AND TELEVISION APPARATUS EQUIPPED WITH SAME

(75) Inventor: Shoichiro Nishimura, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1439 days.

(21) Appl. No.: 11/901,052

(22) Filed: Sep. 14, 2007

(65) Prior Publication Data

US 2008/0068509 A1    Mar. 20, 2008

(30) Foreign Application Priority Data

Sep. 19, 2006   (JP) .................................. 2006-252689

(51) Int. Cl.
 H04N 5/58    (2006.01)
 H04N 5/445   (2011.01)
 G05B 19/02   (2006.01)

(52) U.S. Cl. ......... 348/673; 348/177; 348/687; 348/734

(58) Field of Classification Search .......... 348/569–721, 348/725
 See application file for complete search history.

(56) References Cited

U.S. PATENT DOCUMENTS

| | | | | |
|---|---|---|---|---|
| 5,945,988 A * | 8/1999 | Williams et al. | ............... | 715/747 |
| 6,008,836 A * | 12/1999 | Bruck et al. | ................... | 725/131 |
| 6,342,925 B1 * | 1/2002 | Akhavan et al. | ............... | 348/563 |
| 6,530,083 B1 * | 3/2003 | Liebenow | ........................ | 725/46 |
| 7,500,177 B2 * | 3/2009 | Humpleman et al. | ......... | 715/205 |
| 8,181,216 B2 * | 5/2012 | Kondo et al. | .................. | 725/118 |
| 2002/0171762 A1 * | 11/2002 | Maxson et al. | ............... | 348/552 |
| 2003/0007001 A1 * | 1/2003 | Zimmerman | .................. | 345/716 |
| 2003/0231241 A1 * | 12/2003 | Iida | ........................... | 348/207.99 |
| 2004/0123327 A1 * | 6/2004 | Fai Ma et al. | .................. | 725/100 |
| 2004/0227911 A1 * | 11/2004 | Salvatori et al. | ............... | 353/122 |
| 2005/0132401 A1 * | 6/2005 | Boccon-Gibod et al. | ........ | 725/34 |
| 2005/0281289 A1 * | 12/2005 | Huang et al. | ................... | 370/484 |
| 2006/0005221 A1 * | 1/2006 | MacBeth et al. | ................ | 725/47 |
| 2006/0015911 A1 * | 1/2006 | Dean | ............................... | 725/74 |
| 2007/0296867 A1 * | 12/2007 | Park | .............................. | 348/602 |
| 2008/0231761 A1 * | 9/2008 | Nishikata et al. | ............. | 348/734 |

FOREIGN PATENT DOCUMENTS

| | | |
|---|---|---|
| JP | 01-264082 | 10/1989 |
| JP | 05-207399 | 8/1993 |
| JP | 2002-238001 | 8/2002 |
| JP | 2003-274301 A | 9/2003 |

OTHER PUBLICATIONS

Extended Europan search report dated Jun. 14, 2011.

* cited by examiner

*Primary Examiner* — Vivek Srivastava
*Assistant Examiner* — Carmine Malangone
(74) *Attorney, Agent, or Firm* — Yokoi & Co., U.S.A., Inc.; Toshiyuki Yokoi

(57) ABSTRACT

A television apparatus 100 is so designed as to store into ROM 14 the table that contains image control parameters and tone control parameters used for approximating the image and tone characteristics from different manufacturers wherein a microcomputer 13 reads and uses the image control parameters and the tone control parameters from the ROM 14 to thereby issue a signal processing instruction to a video processing circuit 11 and an audio processing circuit 12 in order to approximate the image and tone of each manufacturer. This allows collective control of image and tone and also allows a user to select collectively controlled image and tone easily.

7 Claims, 7 Drawing Sheets

FIG. 2

| CONTROL ITEM | PARAMETER |
|---|---|
| BRIGHTNESS | 4 |
| CONTRAST | 3 |
| SHARPNESS | 3 |
| TILT | 3 |
| COLOR TEMPERATURE | 10000 |
| TREBLE | 3 |
| BASSE | 3 |
| LOUDNESS | 3 |

FIG. 3

| CONTROL ITEM | PARAMETER |
|---|---|
| BRIGHTNESS | 3 |
| CONTRAST | 5 |
| SHARPNESS | 3 |
| TILT | 3 |
| COLOR TEMPERATURE | 9000 |
| TREBLE | 3 |
| BASSE | 3 |
| LOUDNESS | 3 |

IMAGE/TONE CONTROL DEVICE AND TELEVISION APPARATUS EQUIPPED WITH SAME

CROSS-REFERENCES TO RELATED APPLICATIONS

The present application is related to the Japanese Patent Application No. 2006-252689, filed Sep. 19, 2006, the entire disclosure of which is expressly incorporated by reference herein.

BACKGROUND OF THE INVENTION

1. Field of the Invention

The presents invention relates to an image/tone control device that controls the quality of an image and an audio, and more specifically to an image/tone control device wherein control parameters are collectively handled, and a television apparatus equipped with the image/tone control device.

2. Description of the Related Art

FIG. 7 shows a conventional image/tone control device used for a television apparatus and the like. The image/tone control device 1 is so designed as to receive a video signal, perform the predetermined signal processing on the received video signal, and process an image and a tone. The image/tone control device 1 includes: a video processing circuit 2 that performs predetermined signal processing on an received video signal; an audio processing circuit 3 that performs predetermined signal processing on a received audio signal; a ROM 4 that stores the parameter to be processed by the video processing circuit 2 and the parameter to be processed by the audio processing circuit 3; and a microcomputer 5 that refers to each value of the parameters stored in the ROM 4 and issues instructions to the video processing circuit 2 and the audio processing circuit 3 to cause them perform the signal processing.

In this configuration, each of the video processing circuit 2 and the audio processing circuit 3 receives the instruction from the microcomputer 5 and performs the signal processing according to the parameter stored in the ROM 4.

The signal processing to be performed by the video processing circuit 2 and the audio processing circuit 3 of an image/tone control device 1 can be controlled by a user through the operation of a remote control 6. The types of signal processing to be performed on a video signal by the video processing circuit 2 include sharpness, brightness, contrast, tilt, gamma and color temperature corrections. A user operates the remote control 6 to change each signal processing value, while, for example, referring to a menu screen displayed on the display. Based on the signal processing value optionally changed by a user, the video processing circuit 2 processes a video signal.

This image/tone control device has several types of correction items as described above, and thus it is possible to produce an image and a tone desired by a user. However, it is disadvantageous that there are many correction items and a user needs to adjust those items individually, which is far from user-friendly especially for a user who is unfamiliar with the image/tone correction operation. This prevents most users from using the image/tone control device, and makes this valuable device useless.

Also disclosed is the invention wherein television programs are recorded on a video recorder through the use of a remote control for a television apparatus, as one example of a method for making a video recorder easier to use.

That is, the television apparatus has a program function that accepts recording conditions and, when programmed time comes, transmits the recording conditions to the video recorder. Thanks to this function, the video recorder is controlled by a remote control of the television apparatus (refer to, for example, Japanese Unexamined Patent Application Publication (JP-A No. 2002-238001).

Another invention is disclosed wherein plural image control items are controlled collectively in order for a user to control image easily. That is, a memory is provided that stores plural image control parameters collectively and the microcomputer refers to the memory to perform image control collectively (refer to, for example, JP-A No. 1989-254082).

Still another invention is disclosed wherein when AI signal processing for automatic image/tone control has been done, a user is informed of the fact that the AI signal processing has been done. That is, the television apparatus is provided with a function of displaying simultaneously both a portion where image control has been done and a portion where image has not been done on screen, and thereby a user is able to compare these two portions and check that the AI signal processing has been done (refer to, for example, JP-A No. 1993-207399).

A problem of the invention of JP-A No. 2002-238001 is that it is only applicable to video recording and is not an invention to facilitate image/tone control like the present invention.

Also, the invention of JP-A No. 1989-264082 described above has the following problem:

This invention makes it easy for a user to control image by allowing collective control of image. For this purpose, it is necessary for a user to combine the control items or for the factory to preset the combination before shipment.

However, in the former case a user must combine the control items, which is still inconvenient for users who are unfamiliar with the control operation. In the latter case, although the combination of control items is preset before shipment and a user needs not to combine them, the collectively preset combination may not be user's preference. In addition, there is no guideline for selecting the collectively combined control items, which could cause the inconvenience of the selection by a user.

A problem of the invention of JP-A No. 1993-207399 described above is that it is an invention to determine whether a user has done image control after the automatic image control and not an invention to resolve the inconvenience of controlling image/tone, unlike the present invention.

BRIEF SUMMARY OF THE INVENTION

The present invention is to allow image/tone control to be performed collectively, and also discloses an image/tone control device that makes it easy for a user to select the collectively controlled image/tone, as well as a television apparatus equipped with the image/tone control device.

One aspect of the present invention resides in an image/tone control device equipped with an image control circuit that performs predetermined signal processing on a video signal and a tone control circuit that performs predetermined signal processing on an audio signal, including:

an image/tone characteristics recording unit that collectively stores, in a manufacturer-dependent manner, image control parameters with which the image control circuit performs the signal processing and tone control parameters with which the tone control circuit performs the signal processing as control values, the image control parameters and the tone control parameters used for approximating the image and tone of television apparatuses from different manufacturers; and a unit of issuing image/tone control instruction that issues instructions for controlling image and tone to the image control circuit and the tone control circuit, based on the parameters stored in the image/tone characteristics recording unit.

In the configuration described above, the signal processing parameters used by the image control circuit and the tone control circuit are stored in the image/tone characteristics recording unit, and the unit of issuing image/tone control instruction refers to the image/tone characteristics recording unit and outputs instructions to the image control circuit and the tone control circuit. At this time, the image/tone characteristics recording unit collectively stores the parameters that have been approximated to the image and tone characteristics from different manufacturers' television apparatuses. This makes it possible for a user to control the image and tone collectively, and to optionally select the image and tone control parameters by the desired manufacturer's name, thus facilitating the selection of control values.

An optional aspect of the present invention provides an image/tone control device, wherein the image/tone characteristics recording unit is configured to store such parameters as of contrast, tint, brightness, sharpness, gamma value, and color temperature as image control items in order to approximate to the image characteristics of television apparatuses from different manufacturers.

In this configuration, the image/tone characteristics recording unit stores the control values including contrast, tint, brightness, sharpness, gamma value, and color temperature by approximating them to the image control values from different manufacturers. Consequently, it is possible to display images having image characteristics that are approximate to those of television apparatuses from different manufacturers, in terms of these control items.

Another optional aspect of the present invention provides an image/tone control device, wherein the image/tone characteristics recording unit is configured to store a tone control parameter as a tone control item in order to approximate to the tone characteristics of television apparatuses from different manufacturers.

In this configuration, the image/tone characteristics recording unit can output tone control parameters by approximating them to the tone characteristics of television apparatuses from different manufacturers.

Another optional aspect of the present invention provides an image/tone control device, wherein the unit of issuing image/tone control instruction is implemented with a microcomputer.

In this configuration, the unit of issuing image/tone control instruction is implemented with a microcomputer and therefore it is possible to realize the unit of issuing image/tone control instruction in a simple method using conventional components.

Another optional aspect of the present invention provides an image/tone control device, wherein the image/tone characteristics recording unit is stored in a memory IC available for the microcomputer refers to.

In this configuration, the image/tone characteristics recording unit is realized with a memory IC to which the microcomputer refers. The memory IC includes not only a semiconductor such as a ROM but also an HDD conceptually. Specifically, it is also possible to record the image and tone control parameters in tables within a memory IC so that the microcomputer can easily refer to the parameters.

Also, the parameters stored in the image/tone characteristics recording unit may be not only fixed at shipment but also adjustable by a user. Accordingly, another optional aspect of the present invention provides an image/tone control device, wherein: the unit of issuing image/tone control instruction is configured to accept a predetermined instruction and to issue instructions to the image control circuit and the tone control circuit based on the accepted instruction; and the image/tone characteristics recording unit is configured to issue an instruction by combining image and tone control parameters from different manufacturers, based on an instruction from the unit of issuing image/tone control instruction.

In this configuration, it is possible for a user to combine the manufacturer-specific parameters stored in the image/tone characteristics recording unit, through the unit of issuing image/tone control instruction. That is, a user can combine the manufacturer-specific image and tone features to achieve a desired image and tone in a simple method. As an example, the combination may include individual signal processing for image and tone, theater mode to simulate the feeling of being at a movie theater, and sport mode to display sports programs. This convenience in image/tone control will appeal to a user and encourage positive use thereof.

Another aspect of the present invention provides a television apparatus including:

an image and tone control device including a video processing circuit that receives video signals composed of image signals and audio signals and performs predetermined signal processing on the image signal, and an audio processing circuit that performs predetermined signal processing on the audio signal;

a display panel that displays an image based on the image signal processed by the video processing circuit;

a speaker that outputs an audio based on the audio signal processed by the audio processing circuit;

a microcomputer that issues signal processing instructions to the image and tone control device based on a user's operation; and a memory Integrated Circuit (IC) that stores programs and tables to be executed by the microcomputer, the memory IC including:

an image and tone characteristics table that serves to collectively store, for a television apparatus of each manufacturer, image control parameters of contrast, tint, brightness, sharpness, gamma value, and color temperature with which the video processing circuit performs signal processing and tone control parameters with which the audio processing circuit performs signal processing, for approximating the image and tone characteristics from different manufacturers; and an image and tone control program configured so that when a user selects a manufacturer to which a user wants to approximate the image and tone, the microcomputer refers to the image and tone characteristics table, refers to signal processing parameters used for approximation to the selected manufacturer-specific image and tone of the television apparatus, and issues image and tone control instructions to the video processing circuit and the audio processing circuit.

As described above, according to the present invention, it is possible for a user to carry out image and tone controls collectively and also to select the image and tone to be collectively controlled in a simple method.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout:

FIG. 2 is an exemplary illustration of a schematic diagram showing an image/tone characteristics table containing parameters approximated to the image and tone of, for example, a SONY television A;

FIG. 3 is an exemplary illustration of a schematic diagram showing an image/tone characteristics table containing parameters approximated to the image and tone of, for example, a Matsushita television B;

FIG. 7 shows an exemplary illustration of a conventional image/tone control device used in a television apparatus and the like.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized. The following detailed description of an image/tone control device of the present invention is made based on a television apparatus using the image/tone control device. However, application of the image/tone control device of the present invention is not limited to the television apparatus and it is possible to apply to any apparatus that uses the image/tone control device of the present invention. The description here of the embodiments of the present invention is made in the following order:

(1) A first embodiment
(2) Summary of the first embodiment
(3) A second embodiment
(4) Summary of the second embodiment (1) A First Embodiment A first embodiment of a television apparatus of the present invention is described below with reference to FIGS. 1 through 5.

Figure 1:
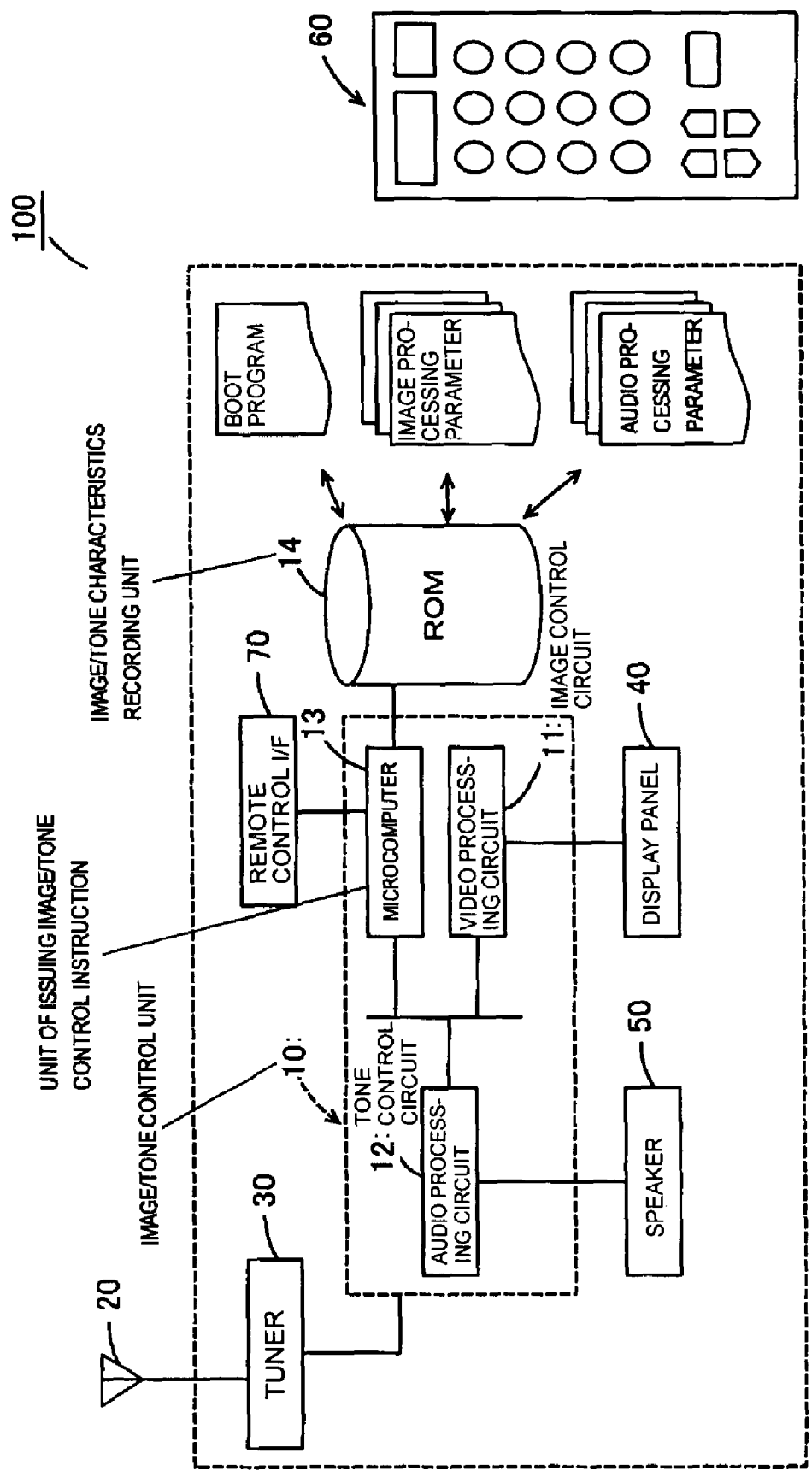
FIG. 1 is an exemplary illustration of a block diagram of a television apparatus.

FIG. 1 is a block diagram of a television apparatus of the first embodiment. The television apparatus 100 receives a video signal from television broadcast and an external equipment and outputs image and audio. The television apparatus 100 includes: a remote control 60 that accepts a user's operation; a tuner 30 that accepts an operation from the remote control 60 and extracts predetermined video and audio signals from the television broadcast received by an antenna 20; an image and tone control unit 10 (image and tone control device) that performs signal processing on the extracted video and audio signals; a remote control I/F 70 that converts and outputs an operation signal from the remote control 60; a display panel 40 that displays an image based on the video signal; and a speaker 50 that outputs an audio based on the audio signal. In this configuration, after the remote control I/F 70 accepts an operation signal from the remote control 60 and the image/tone control unit 10 performs signal processing on the video and audio signals extracted by the tuner 30, the display panel 40 displays an image and the speaker outputs an audio.

The image and tone control unit 10 according to the present invention will be described.

The image/tone control unit 10 performs predetermined signal processing on the video and audio signals extracted by the tuner 30. For this purpose, the image/tone control unit 10 has: a video processing circuit 11 (image control circuit) that performs predetermined signal processing on a video signal; an audio processing circuit 12 (tone control circuit) that performs predetermined signal processing on an audio signal; a microcomputer 13 that controls the video processing circuit 11 and the audio processing circuit 12 based on an operation from the remote control 60 and a predetermined program; and a ROM 14 (image/tone characteristics recording unit) that is a memory IC storing a program and table with which the microcomputer 13 performs predetermined control. In this configuration, the image/tone control unit 10 performs predetermined signal processing on the received video and audio signals under the control of the microcomputer 13. At this time, the microcomputer 13 performs this control by referring to the program and table stored in the ROM 14.

Next, the signal processing to be performed by the image/tone control unit 10 is described. The video processing circuit 11 performs signal processing on a video signal received from the tuner 30 according to the image control items. The signal processing to be performed by the video processing circuit 11 includes brightness control, contrast control, sharpness control to enhance the outline of an image to be displayed on screen, tint control, color temperature correction, and gamma correction. Since the configuration for performing each signal processing is a known art, it is described briefly here. The video signal received from the tuner 30 is composed of a brightness signal Y and Y/color difference signal (R-Y, R-B) that is a color signal made up of a difference between the brightness signal and R or B. Therefore, the video processing circuit 11 separates the received Y/color difference signal into a color signal and a brightness signal again, performs signal processing on the color signal and the brightness signal respectively, and thereby performs the abovementioned signal processing other than the gamma correction.

Parameters to be used for performing the abovementioned signal processing are stored in the form of a table in the image/tone characteristics recording unit 14, and the microcomputer 13 refers to the table and issues an instruction to the video processing circuit 11 for performing signal processing based on the parameter values contained in the table. On receipt of the instruction, the video processing circuit 11 performs signal processing on each of the color signal and the brightness signal separated from the Y/color difference signal.

The gamma correction is a correction to uniform the display characteristics among different display panels 40 with different display characteristics. When converting a video signal, which is a digital signal to be input to the display panel, into an analog signal, the correspondence between the digital value of the video signal and the voltage value of the analog signal is changed to uniform the display characteristics of different display panels 40. It is also possible to intentionally change the correspondence between the voltage values of digital and analog signals to cause the display panel 40 to display a characteristic image. Specifically, although a normal gamma value is around 0.7, it is possible to display a characteristic image by changing this value to 0.5 or 0.8. Also, for the gamma correction described above, the correspondence between the voltage values of video and analog signals is stored in the table in the ROM 14. This allows the video processing circuit 11 to refer to the table according to the instruction from the microcomputer 13 and correct a gamma value with an inherent value.

The specific signal processing to be performed by the audio processing circuit 12 will be described. The audio processing circuit 12 performs tone control on the received audio signal according to the tone control items, and thereby adjusts the high or low part of an audio to be output from the speaker 50. Since the tone control by the video processing circuit 11 is a known art, its detailed description is omitted here. Examples of tone control include treble control, bass control, and loudness control. Parameters for the tone control by the audio processing circuit 12 are also stored in the table in the image/tone characteristics recording unit 14 as with the video processing circuit 11, and the microcomputer 13 refers to the image/tone characteristic table and issues a predetermined instruction to the audio processing circuit 12.

The signal processing by the video processing circuit 11 and the audio processing circuit 12 is normally done directly by a user through the operation of the remote control 60, but also automatically done by the microcomputer 13 under the instructions of a program stored in the image/tone characteristics recording unit 14. Even in the latter case where the microcomputer 13 automatically performs each signal processing, it is necessary for a user to set the parameter values in the image/tone characteristics table stored in the image/tone characteristics recording unit 14 except when the parameter values are set at shipment from the factory. This parameter setting is difficult for users who are unfamiliar with the signal processing and is inconvenient. Therefore, the present invention allows collective signal processing with preset values, and also provides a guideline for selecting signal processing by making the collective signal processing correspond with the image and tone characteristics from different manufacturers. Specifically, when a user selects, for example, manufacturer A on the menu screen or the like, the television apparatus 100 of the present invention performs signal processing that is approximate to the image and tone of the manufacturer A. This makes it possible for a user to become familiar with the image/tone control function by selecting the image and tone from different manufacturers.

To realize the function described above, the television apparatus of the present invention is configured so that the image and tone control parameters are stored for the image and tone characteristics of each manufacturer and that the microcomputer 13 issues instructions to the video processing circuit 11 and the audio processing circuit 12 collectively based on the selection made by a user. For this purpose, a plurality of image/tone characteristics tables containing the signal processing parameters of each manufacturer are stored in the ROM 14. The stored parameters for each manufacturer are naturally only those corresponding to the image and tone control function of the television apparatus 100, and it is not necessary to reproduce the image and tone of each manufacturer exactly.

Examples of the parameters to be stored in the image/tone characteristics table are described below.

FIG. 2 is a schematic diagram showing an image/tone characteristics table storing parameters that are approximate to the image and tone of a SONY television B (SONY: registered trademark No. 0604177). The image of the SONY television B emphasizes blue and sets the brightness to a higher value. A normal color temperature setting can be 8000K to 9000K. Consequently, for the parameters shown here, blue is emphasized with color temperature set to 10000K and the brightness is set higher. This makes an image displayed on screen bluish and totally brighter.

As another example, FIG. 3 shows a schematic diagram of an image/tone characteristics table containing parameters that are approximate to the image and tone of a Matsushita television C (Matsushita Electric Industry: registered trademark No. 3110427). The feature of the Matsushita television C is in the black-level graduation. Therefore, in the image/tone characteristics table, contrast value is set lower than at the time of presetting so as to increase the black level representation. This increases graduation at the black area of an image displayed on screen and thereby gives a depth to the image.

The image and tone control values grouped by the manufacturer are executed by, for example, selecting the icon of each manufacturer on screen with a remote control.

Figure 4:
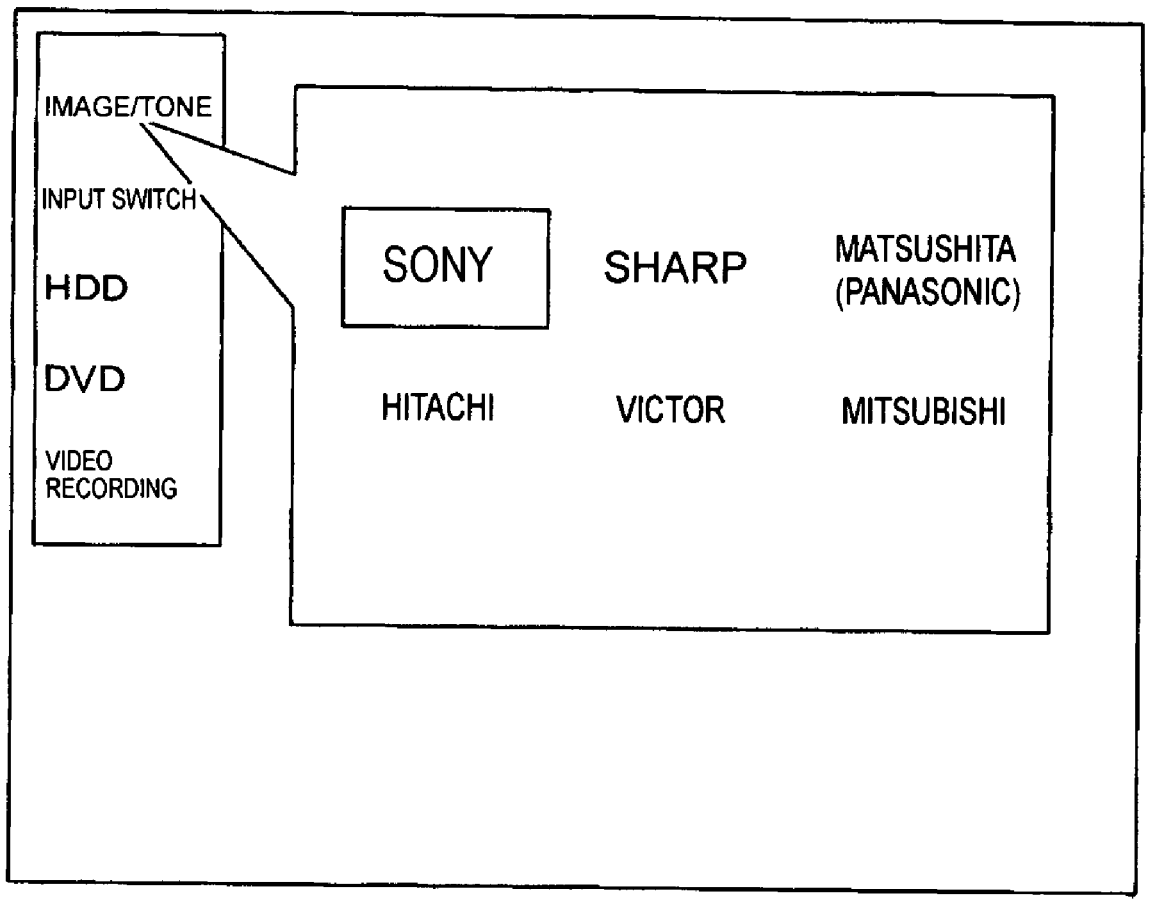
FIG. 4 shows an exemplary illustration of an exemplary icon that is displayed on screen during image/tone control.

FIG. 4 shows exemplary icons to be displayed on screen during the time of image/tone control.

In this figure, when the image/tone control is selected in the menu window, the selection window appears on screen. When a user selects one of the manufacturers displayed in the selection window with the remote control 60, an image/tone control instruction is issued. An image/tone control program is described below that is executed by the microcomputer 13 according to the instruction.

Figure 5:
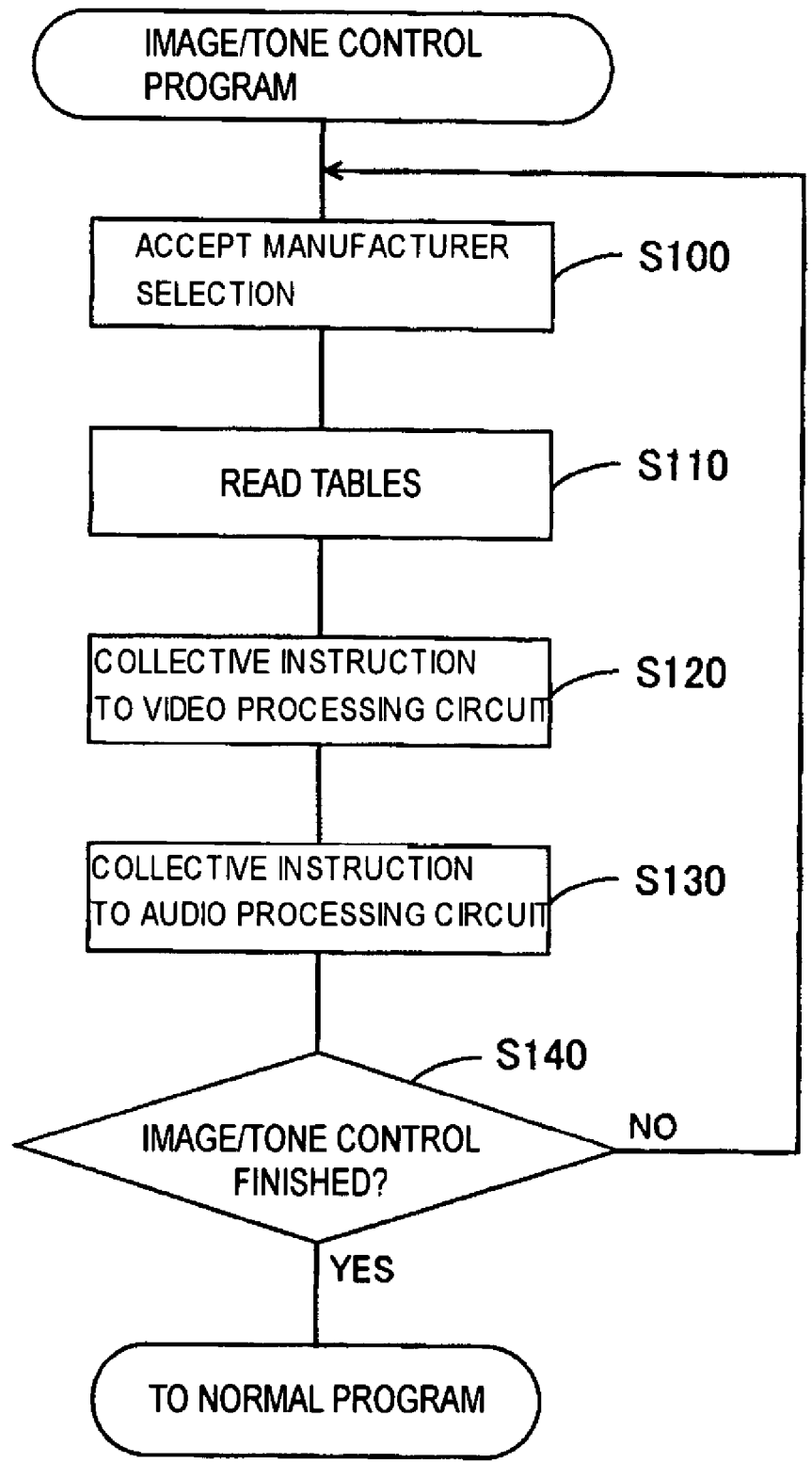
FIG. 5 is an exemplary illustration of a flowchart showing the process to be performed by a microcomputer according to an image/tone control program.

FIG. 5 is a flowchart showing the process to be performed by the microcomputer 13 according to the image/tone control program.

When a user selects the image/tone control in the menu window with the remote control 60, the microcomputer 13 starts the image/tone control program stored in the ROM 14. Next, when a user selects a predetermined manufacturer from the strings corresponding to different manufacturers displayed in the menu window, the microcomputer 13 accepts the selection instruction (step S100), and refers to the image/tone characteristics table, in the ROM 14, corresponding to the manufacturer selected by a user (step S110). Then, the microcomputer 13 issues signal processing instructions collectively to the video processing circuit 11 based on the parameters stored in the image/tone characteristics table to which the microcomputer 13 referred (step S120). Also, the microcomputer 13 issues signal processing instructions collectively to the audio processing circuit 12 based on the parameters stored in the image/tone characteristics table (step S130). Then, if a user selects the end of the image/tone control with the remote control 60, the microcomputer 13 is prompted to move to a normal program, otherwise to accept manufacturer selection by a user again (step S140).

(2) Summary of the First Embodiment

The configuration described above allows the television apparatus 100 to store the image/tone control parameter approximated to the image/tone of televisions from different manufacturers, and to output the image/tone approximated to the image/tone of a television selected by a user. As a result, a user is able to perform various image/tone controls collectively and also to select the image/tone control while imaging a television of the selected manufacturer. This makes it possible to use a manufacturer name as a guideline for selection when controlling the image and tone, thereby improving the operability.

(2) A Second Embodiment

In the first embodiment described above, the image/tone control is done by collectively selecting the control items based on the manufacturer name. However, different manufacturers have different features in the control items, and there is a case where a user wants to reproduce the features from different manufacturers. Specifically, if a manufacturer A has a feature in image and a manufacturer B has a feature in audio, a user may approximate the image to the feature of the manufacturer A and the audio to the feature of the manufacturer B. Therefore, the second embodiment of the present invention is adapted to be capable of combining the image and tone characteristics from different manufacturers based on the instruction from a user. This is advantageous in that the image/tone control is positively used when a user has become somewhat familiar with the image/tone control.

Figure 6:
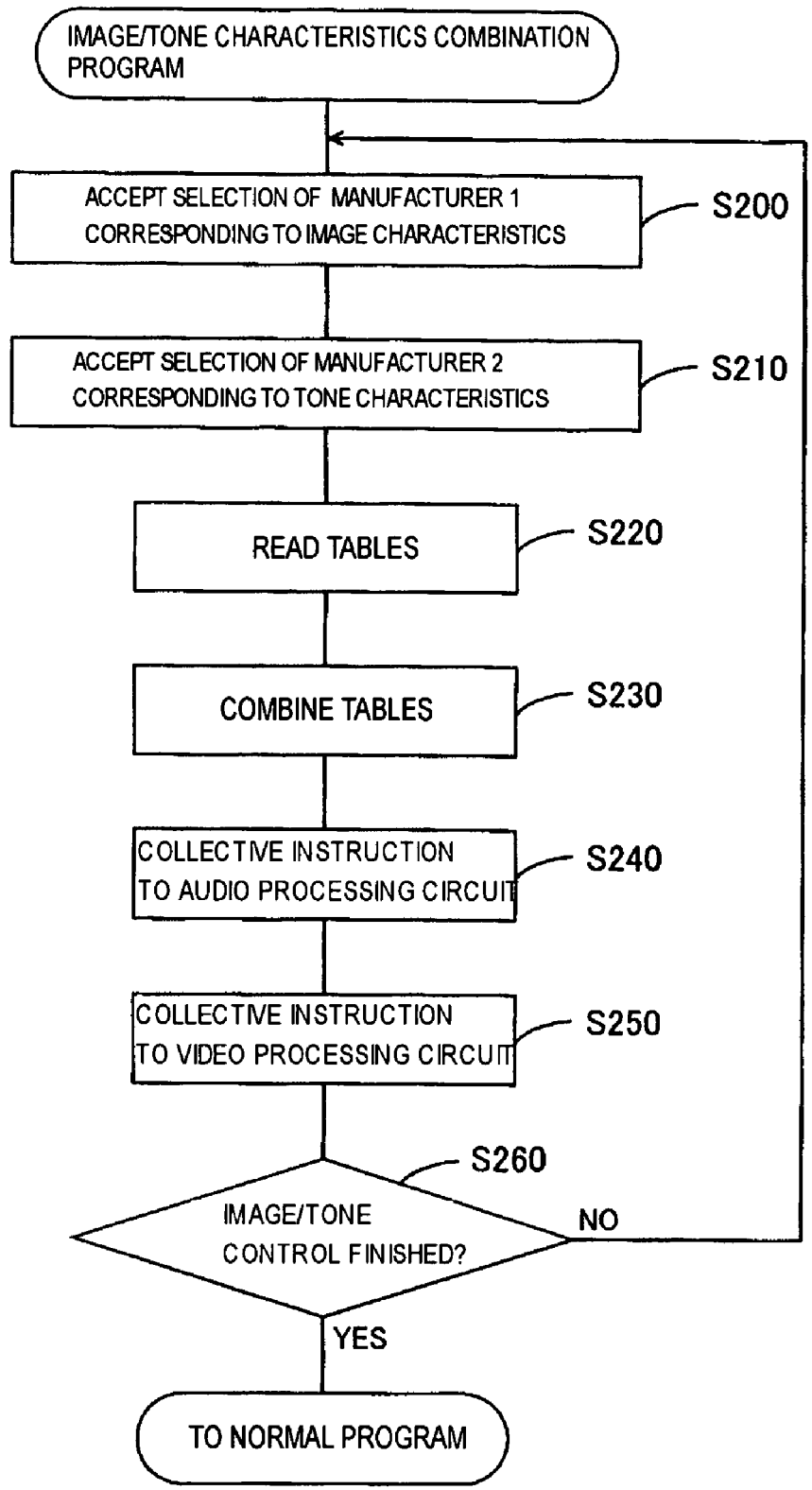
FIG. 6 is an exemplary illustration of a flowchart showing the process to be performed by the microcomputer according to the image/tone control program.
Figure 7:
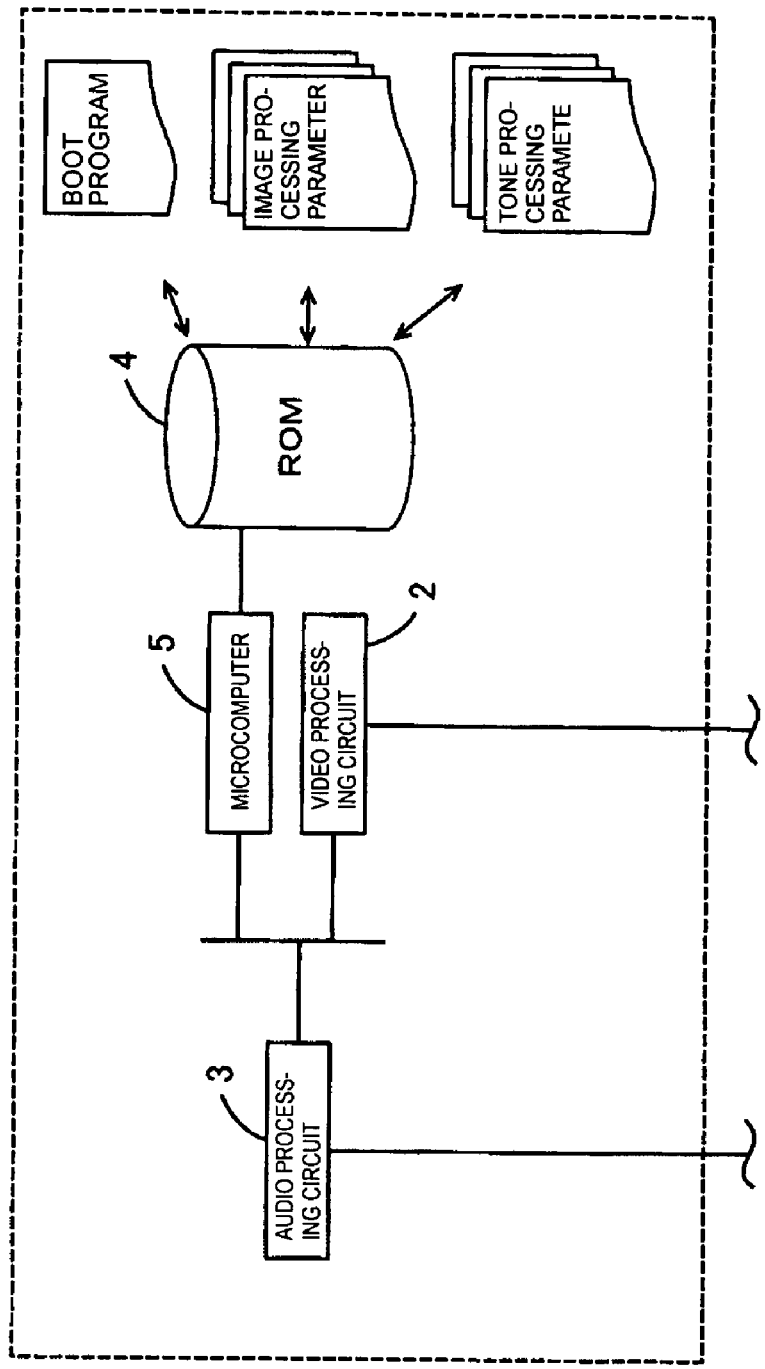

The specific configuration of the second embodiment is described below with reference to FIG. 6. To realize the function described above, the television apparatus 100 stores an image/tone characteristics combination program to be activated by the ROM 14. FIG. 6 is a flowchart of the process to be performed by the microcomputer 14 according to the image/tone combination program in the second embodiment. The process shown by the flowchart in FIG. 6 is performed when the image/tone control program in FIG. 5 is activated. Although the second embodiment is described based on the combination of image features and tone features as a combination of features for each manufacturer, the present invention is not limited to the configuration of this embodiment, alternatively, it is also possible to combine individual signal processing for controlling image features. Furthermore, if, for example, a theater mode to simulate the reproduction in a movie theater or a live mode to display sports live is included in the image control items, it is possible to create a new image/tone characteristics table containing these modes.

When a user selects the image/tone control menu in the menu window and also selects an image/tone combination, the microcomputer 13 reads the image/tone characteristics combination program from the image/tone characteristics recording unit 14. Then, a user selects from manufacturer's list a string corresponding to the manufacturer that has image features a user wants to approximate, and the microcomputer 13 accepts the instruction (step S200). Also, a user selects from manufacturer's list a string corresponding to the manufacturer that has tone features a user wants to approximate, and the microcomputer accepts the instruction (step 210). Based on the accepted instruction, the microcomputer 13 reads two image/tone characteristics tables from the ROM 14 (step S220), and creates a new image/tone characteristics table by combining the signal processing parameters for controlling the image features and tone feature in the two image/tone characteristics table (step S230). The newly created image/tone characteristics table can be stored in the ROM 14 and read from the same.

Also, the microcomputer 13 outputs the instructions collectively to the video processing circuit 11 based on the newly created image/tone characteristics table (step S240). Likewise, the microcomputer 13 outputs the instructions collectively to the audio processing circuit 12 based on the new image/tone characteristics table (step S250). If a user selects the end of the image/tone control with the remote control 60, microcomputer 13 is prompted to move to a normal program from the microcomputer 13, otherwise to accept a manufacturer selection from a user again (step S260).

(4) Summary of the Second Embodiment

The second embodiment allows the television apparatus 100 to combine the image features and tone features corresponding to the features of each manufacturer based on an instruction from a user so as to create new image and tone. Therefore, the second embodiment has the following advantage in addition to that of the first embodiment. That is, it is possible to control the image and tone as desired by a user by combining the image and tone features from different manufacturers based on the instruction from a user using the remote control 60. At this time, since manufacturer names are used for controlling the image and tone, a user can easily image the control details, thus encouraging a user to use the image/tone control.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A television apparatus, comprising:
an image and tone control device, including a video processing circuit that receives video signals composed of image signals and audio signals, and performs predetermined signal processing on the image signal, and an audio processing circuit that performs predetermined signal processing on the audio signal;
a display panel that displays an image based on the image signal processed by the video processing circuit;
a speaker that outputs an audio based on the audio signal processed by the audio processing circuit;
a microcomputer that issues signal processing instructions to the image and tone control device based on a user's operation; and
a memory Integrated Circuit (IC) that stores programs and tables to be executed by the microcomputer, the memory IC, including:

an image and tone characteristics table that serves to collectively store, for a television apparatus of each manufacturer of a plurality of different manufacturers, image control parameters of contrast, tint, brightness, sharpness, gamma value, and color temperature with which the video processing circuit performs signal processing and tone control parameters with which the audio processing circuit performs signal processing, for approximating the image and tone characteristics from the different manufacturers; and an image and tone control program configured so that when a user selects a manufacturer of the plurality of different manufacturers to which a user wants to approximate the image and tone, the microcomputer refers to the image and tone characteristics table, refers to signal processing parameters used for approximation to the selected manufacturer-specific image and tone of the television apparatus, and issues image and tone control instructions to the video processing circuit and the audio processing circuit, wherein the issuing of image and tone control instructions to the video processing circuit and the audio processing circuit is performed without the user individually adjusting the image control parameters and the tone control parameters.

2. An image and tone control device equipped with an image control circuit that performs predetermined signal processing on a video signal and a tone control circuit that performs predetermined signal processing on an audio signal, comprising:

an image and tone characteristics recording unit that collectively stores, in a manufacturer-dependent manner for a plurality of different manufacturers, image control parameters with which the image control circuit performs the signal processing and tone control parameters with which the tone control circuit performs the signal processing as control values, the image control parameters and the tone control parameters used for approximating the image and tone of television apparatuses from the different manufacturers; and a unit of issuing image and tone control instruction that issues instructions for controlling image and tone to the image control circuit and the tone control circuit respectively, based on the image control parameters and the tone control parameters stored in the image and tone characteristics recording unit, wherein the issuing of image and tone control instructions to the video processing circuit and the audio processing circuit is performed without the user individually adjusting the image control parameters and the tone control parameters.

3. An image and tone control device according to claim 2, wherein the image and tone characteristics recording unit is configured to store image control parameters as of contrast, tint, brightness, sharpness, gamma value, and color temperature as image control items in order to approximate to the image characteristics of television apparatuses from the different manufacturers.

4. An image and tone control device according to claim 2, wherein the image and tone characteristics recording unit is configured to store a tone control parameter as a tone control item in order to approximate to the tone characteristics of television apparatuses from the different manufacturers.

5. An image and tone control device according to claim 2, wherein the unit of issuing image and tone control instruction is implemented with a microcomputer.

6. An image and tone control device according to claim 5, wherein the image and tone characteristics recording unit is stored in a memory Integrated Circuit (IC) available for communication with the microcomputer.

7. An image and tone control device according to claim 2, wherein:

the unit of issuing image and tone control instruction is configured to accept a predetermined instruction and to issue instructions to the image control circuit and the tone control circuit based on the accepted instruction; and the image and tone characteristics recording unit is configured to issue an instruction by combining image and tone control parameters from the different manufacturers, based on an instruction from the unit of issuing image and tone control instruction.

\* \* \* \* \*